(12) United States Patent
Langel et al.

(10) Patent No.: US 6,451,963 B1
(45) Date of Patent: Sep. 17, 2002

(54) METHOD OF COAGULATING AQUEOUS PUR DISPERSIONS CONTAINING DISPERSED THEREIN REACTIVE OR SECONDARY CROSS-LINKED POLYURETHANE, THE PRODUCTS OBTAINED THEREBY AND THEIR USE

(75) Inventors: Rolf Langel, Leverkusen; Detlef-Ingo Schütze, Köln; Werner Bälz, Gladbach; Eberhard König, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/857,537

(22) PCT Filed: Nov. 24, 1999

(86) PCT No.: PCT/EP99/09068

§ 371 (c)(1),
(2), (4) Date: Jun. 6, 2001

(87) PCT Pub. No.: WO00/34352

PCT Pub. Date: Jun. 15, 2000

(30) Foreign Application Priority Data

Dec. 7, 1998 (DE) .......................................... 198 56 412
Dec. 10, 1998 (DE) .......................................... 198 56 968

(51) Int. Cl.$^7$ .................................................. C08F 6/00
(52) U.S. Cl. ...................................................... 528/480
(58) Field of Search ......................................... 528/480

(56) References Cited

U.S. PATENT DOCUMENTS

| 3,791,849 A | 2/1974 | Hammer et al. ............... 116/63 |
| 4,108,814 A | 8/1978 | Reiff et al. .......... 260/29.2 TN |
| 4,888,379 A | 12/1989 | Henning et al. ............ 524/500 |

FOREIGN PATENT DOCUMENTS

| DE | 4218184 | 12/1993 |
| DE | 19750186 | 5/1999 |
| EP | 0 684 286 | 11/1995 |

*Primary Examiner*—Terressa M. Boykin
(74) *Attorney, Agent, or Firm*—Joseph C. Gil; Thomas W. Roy

(57) ABSTRACT

The invention relates to a process for the coagulation of PU dispersions, the coagulation products thus obtained and the use of the coagulated PU dispersions.

Reactive or post-crosslinkable PU dispersions are suitable as PU dispersions for the process according to the invention. The processes according to the invention comprise the production of films, the coating of many different materials and the partial or complete impregnation of nonwoven, knitted or other fabrics for strengthening purposes.

20 Claims, No Drawings

METHOD OF COAGULATING AQUEOUS PUR DISPERSIONS CONTAINING DISPERSED THEREIN REACTIVE OR SECONDARY CROSS-LINKED POLYURETHANE, THE PRODUCTS OBTAINED THEREBY AND THEIR USE

BACKGROUND OF THE INVENTION

The invention relates to a process for the coagulation of PU dispersions, the coagulation products thus obtained and the use of the coagulated PU dispersions.

Reactive or post-crosslinkable PU dispersions are suitable as PU dispersions for the process according to the invention. The processes according to the invention comprise the production of films, the coating of a wide variety of materials and the partial or complete impregnation of nonwoven, knitted or other fabrics for strengthening purposes.

The coagulates produced by the processes according to the invention are suitable for use e.g. in the areas of clothing, protective clothing, shoe upper and lining materials, protective gloves, bag and upholstery material, coating of metals, medical and sanitary articles etc.

The production of coated textile fabrics, such as e.g. synthetic leather, has been known for a long time. The coating agent is applied on to the substrate in one or more coats by the direct spread coating process or by the transfer coating process. The coated textile fabrics may be used for the production of outerwear, shoe upper and lining material, bag and upholstery material etc.

SUMMARY OF THE INVENTION

The production of for example, gloves with latex dispersions or in recent years, owing to the occurrence of latex allergies, with polyurethane dispersions is known, the use of polyurethane dispersions for coagulation in particular causing significant technical problems.

DETAILED DESCRIPTION OF THE INVENTION

In the production of high-quality coated textile fabrics, flexibility, tensile strength and softness play a decisive role in terms of the desired comfort, among other things, since stiff fabrics lack comfort.

If the bonding of fibre intersection points is not avoided in the production of flexible coated textile fabrics, flexibility is lost and there is a risk of destroying the bond between textile fibres and binder when subjected to bending strain.

The undesired bonding of fibre bundles and thread intersection points can be avoided by treating the textile fabric e.g. with aqueous dispersions of organic binders and then coagulating these. In this way, increased tensile strength and greater softness of the coated textile fabrics are achieved.

The following methods of coagulation are known:

bath coagulation, in which the substrate is coated with a binder dissolved in an organic solvent (e.g. DMF, DMAC. DMSO THF) and the product thus obtained is passed through a bath of a non-solvent (e.g. water) miscible with the solvent; the coagulation takes place as a result of the extraction of the solvent by the non-solvent. Disadvantages of this process lie particularly in the necessary and costly measures for the safe handling, recovery and re-use of the very large quantities of solvent.

evaporation coagulation, which is based on the use of a volatile solvent and a less volatile non-solvent for the binder; with gentle heating, the solvent preferably escapes first so that the binder coagulates as a result of the constantly increasing proportion of non-solvent; in addition to the use of large quantities of solvents which is again necessary, the enormous technical effort required and the very limited opportunities for optimisation, owing to the process parameters, are disadvantageous.

salt, acid or electrolyte coagulation takes place by immersing the coated substrate or, as in the case of gloves, the form first immersed in the dispersion, in a concentrated salt solution or in acidified water or similar, the binder coagulating as a result of the high electrolyte content; disadvantages of this process lie in the technical complexity and above all the large amount of polluted waste water arising.

the prepolymer method, in which a substrate coated with isocyanate prepolymer is immersed in water and then a polyurea is formed with a porous structure, with the release of $CO_2$. The disadvantages include the very high reactivity of the formulations and the associated short processing times; and coagulation by temperature increase, which is possible for non-post-crosslinkable binders adjusted to be heat sensitive and which often leads to unacceptable results.

In summary, the above-mentioned methods either involve long periods of time for the complete removal of solvents, considerable costs in separating and recovering solvents and on-solvents, the disposal of acid- or salt-laden waste water or they do not lead to results of acceptable quality in every case.

The object of the invention consisted in providing a novel process for aqueous coagulation and products suitable therefor without the disadvantages described. It should enable products of high quality to be achieved in a simple process, with the aid of an aqueous dispersion without or with only a small content of organic solvents and without the use of salt, acid or electrolyte baths.

Surprisingly, it was found that the coagulation according to the invention can be achieved by using aqueous. post-crosslinkable polyurethane dispersions.

The use of the term "polyurethane" also includes polyurethane-polyurea.

The invention therefore provides a process for the coagulation of post-crosslinkable dispersions which is characterised in that post-crosslinkable dispersions are precipitated by thermal treatment at 50 to 120° C., forming a stable, at least partly crosslinked polyurethane or gel.

The process according to the invention is preferably carried out at 75 to 98° C.

The process according to the invention for the coagulation of post-crosslinkable PU dispersions is characterised in that post-crosslinkable dispersions having a content of a) blocked isocyanate groups (calculated as NCO=42) of 0.1 to 7.5 wt. %, preferably 0.9 to 2.0 wt. %, and b) a content of at least one polyamine with at least two (cyclo)aliphatically bonded primary and/or secondary amino groups and/or hydroxyamine, the equivalent ratio of blocked isocyanate groups from a) to amino groups from b) being 1:0.5 to 1:1.5, preferably 1:0.7 to 1:1.2, particularly preferably 1:0.9 to 1:1.1, are precipitated by thermal treatment at 50 to 120° C., preferably 75 to 98° C., forming a stable, at least partly crosslinked polyurethane or gel.

The invention further provides the coagulates produced in accordance with the process according to the invention.

In the process according to the invention for the coagulation of post-crosslinkable dispersions, post-crosslinkable dispersions are precipitated by thermal treatment at 50 to 120° C., forming a stable, at least partly crosslinked polyurethane or gel, characterised in that the dispersions used have a) a content of blocked isocyanate groups (calculated as NCO=42) of 0.1 to 7.5 wt. %, and b) a content of at least one polyamine and/or hydroxyamine with at least two (cyclo)aliphatically bonded primary and/or secondary amino groups, the equivalent ratio of blocked isocyanate groups from a) to amino groups from b) being 1:0.5 to 1:1.5, preferably post-crosslinkable dispersions are precipitated by thermal treatment at 75 to 98° C., forming a stable, at least partly crosslinked polyurethane or gel, characterised in that the dispersions used have a) a content of blocked isocyanate groups (calculated as NCO=42) of 0.25 to 5 wt. %, and b) a content of at least one polyamine and/or hydroxyamine with at least two (cyclo)aliphatically bonded primary and/or secondary amino groups, the equivalent ratio of blocked isocyanate groups from a) to amino groups from b) being 1:0.7 to 1:1.2, particularly preferably characterised in that post-crosslinkable PU dispersions are precipitated by thermal treatment at 75 to 98° C., forming a stable, at least partly crosslinked polyurethane or gel, further characterised in that the dispersions used have a) a content of blocked isocyanate groups (calculated as NCO=42) of 0.7 to 2 wt. %, and b) a content of at least one polyamine and/or hydroxyamine with at least two (cyclo)aliphatically bonded primary and/or secondary amino groups, the equivalent ratio of blocked isocyanate groups from a) to amino groups from b) being 1:0.9 to 1:1.1.

In a preferred variant of the process according to the invention for the coagulation of post-crosslinkable dispersions. dispersions based on hydrophilic raw materials, particularly hydrophilic polyols are used water vapour permeable coagulates thereby being formed.

Post-crosslinkable polyurethane capable of coagulation used in the process according to the invention, which take the form of aqueous dispersions or emulsions, are reaction products of 1. at least one organic di- or polyisocyanate.
2. at least one polyhydroxyl compound with a molecular weight of up to 16000,
3. ionic or potentially ionic hydrophilising agents and/or non-ionic hydrophilising agents,
4. blocking agents for isocyanate groups and
5. optionally low molecular weight mono-, di- or triamines as chain-terminating, chain-extending or chain-branching components wherein, in addition,
6. polyamine crosslinking agents are contained in the dispersion, components 3) being contained in quantities such that a stable dispersion is formed.

The post-crosslinkable polyurethane capable of coagulation used in the process according to the invention which take the form of aqueous dispersions or emulsions, are preferably reaction products of 1. 9 to 30 wt. % of at least one organic diisocyanate,
2. 40 to 85 wt. % of at least one at least difunctional polyhydroxyl compound with a molecular weight of 350 to 4 000,
3. 4 to 22 wt. % ionic or potentially ionic hydrophilising agents and/or non-ionic hydrophilising agents.
4. 0.5 to 5 wt. % blocking agents for isocyanate groups and
5. 0 to 5 wt. % low molecular weight mono-, di- or triamines as chain-terminating, chain-extending or chain-branching components, wherein, in addition 6. 1 to 6 wt. % polyamine crosslinking agents are contained in the dispersion, the content of non-ionic hydrophilising agents 3 being 3 wt. %.

Reactive or post-crosslinkable dispersions, preferably PU dispersions, are used for the process according to the invention. The following may be structural components of such PU dispersions:

1. Organic di- and/or polyisocyanates, such as for example tetramethylene diisocyanate, hexamethylene diisocyanate (HDI), 2-methylpentamethylene diisocyanate, 2,2,4-trimethylhexamethylene diisocyanate (THDI), dodecanemethylene diisocyanate, 1,4-diisocyanatocyclohexane, 3-isocyanatomethyl-3.3.5-trimethylcyclohexyl isocyanate (isophorone diisocyanate=IPDI), 4,4'-diisocyanatodicyclohexylmethane (®Desmodur W), 4.4'-diisocyanato-3,3'-dimethyldicylohexylmethane, 4,4'-diisocyanatodicyclohexylpropane-(2,2), 1,4-diisocyanatobenzene, 2,4- or 2,6-diisocyanatotoluene or mixtures of these isomers, 4,4'-, 2,4'- or 2,2'-diisocyanatodiphenylmethane or mixtures of the isomers, 4,4'-diisocyanatodiphenylpropane-(2,2), p-xylylene diisocyanate and α,α,α',α'-tetramethyl-m- or -p-xylylene diisocyanate (TMXDI) and mixtures consisting of these compounds. For modification purposes small quantities of trimers, urethanes, biurets, allophanates or uretdiones of the above-mentioned diisocyanates may be incorporated MDI, Desmodur W, HDI and/or IPDI are particularly preferred.

2. Polyhydroxyl compounds having 1 to 8, preferably 1.7 to 3.5 hydroxyl groups per molecule and an (average) molecular weight of up to 16,000, preferably up to 4,000. Both defined low molecular weight polyhydroxyl compounds, such as e.g. ethylene glycol, 1,2-, 1,3-propylene glycol, 1,4-butanediol, 1,6-hexanediol, neopentyl glycol, trimethylolpropane, glycerol, reaction products of 1 hydrazine+2 propylene glycol and oligomeric or polymeric polyhydroxyl compounds with molecular weights of 350-10,000, preferably 840 to 3,000 are suitable.

Higher molecular weight hydroxyl compounds comprise the hydroxypolyesters, hydroxypolyethers, hydroxypolythioethers, hydroxypolyacetals, hydroxypolycarbonates and/or hydroxypolyesteramides that are known per se in polyurethane chemistry, preferably those with average molecular weights of 350 to 4,000, particularly preferably those with average molecular weights of 840 to 3,000. Hydroxypolycarbonates and/or hydroxypolyethers are particularly preferred. It is possible to produce particularly hydrolytically stable coagulates with these.

3.a) Ionic or potentially ionic hydrophilising agents, which have an acid group and/or an acid group present in salt form, and at least one isocyanate reactive group, e.g. an —OH or —NH$_2$ group. Examples of these are the Na salt of ethylenediamine-β-ethylsulfonic acid (AAS salt solution), dimethylolpropionic acid(s) (DMPA), dimethylolbutyric acid, aliphatic diols exhibiting Na sulfonate groups according to DE-A 2 446 440, hydroxypivalic acid or adducts of 1 mole diamine, preferably isophorone diamine, and 1 mole of an α,β-unsaturated carboxylic acid, preferably acrylic acid (cf. German Patent Application 19 750 186.9). Hydrophilising agents of the last-mentioned type containing carboxylate and/or carboxyl groups, or of dimethylolpropionic acid, are preferred.

3.b) Non-ionic hydrophilising agents in the form of mono- and/or difunctional polyethylene oxide or polyethylenepropylene oxide alcohols with molecular weights of 300 to 5,000. Particularly preferred are n-butanol-based monohydroxyfunctional ethylene oxide/propylene oxide polyethers with 35 to 85 wt. % ethylene oxide units and a molecular weight of 900 to 2,500. A content of at least 3, particularly preferably at least 6 wt. % non-ionic hydrophilising agents is preferred.

4. Blocking agents for isocyanate groups, such as e.g. oximes (acetone oxime, butanone oxime or cyclohexanone oxime), secondary amines (diisopropylamine, dicyclohexylamine), NH acidic heterocycles (3,5-dimethylpyrazole, imidazole, 1,2,4-triazole), CH acidic esters (malonic acid $C_1$ to $C_4$ alkyl esters, acetoacetic esters) or lactams (ε-caprolactam). Butanone oxime, diisopropylamine and 1,2,4-triazole are particularly preferred.

5. Polyamines as incorporated chain extenders to impart special properties to the polymer backbone of the post-crosslinkable dispersions. These include e.g. the polyamines dealt with in 6. The diaminofunctional hydrophilising agents mentioned in 3a) are also suitable as incorporated chain extenders. Ethylene diamine, IPDA and $H_{12}$ MDA are particularly preferred.

6. Polyamine crosslinking agents for post-crosslinking under the action of heat. These are preferably aliphatic or cycloaliphatic diamines, although trifunctional or more than trifunctional polyamines may optionally also be used to achieve special properties. In principle. it is also possible to use polyamines with additional functional groups, e.g. —OH groups. The polyamine crosslinking agents, which are not incorporated in the polymer framework at normal to slightly elevated ambient temperatures, e.g. 20 to 60° C., may either be mixed in straight away when the reactive dispersions are being prepared or at any later point. Examples of suitable aliphatic polyamines are ethylenediamine, 1,2- and 1,3-propylenediamine, 1,4-tetramethylenediamine, 1,6-hexamethylenediamine, the mixture of isomers of 2,2.4- and 2,4,4-trimethylhexamethylenediamine 2-methylpentamethylenediamine and bis(β-aminoethyl)amine (diethylenetriamine).

Examples of suitable cycloaliphatic polyamines are:

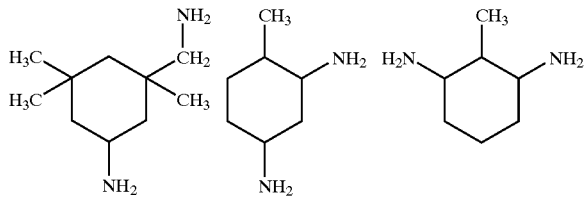

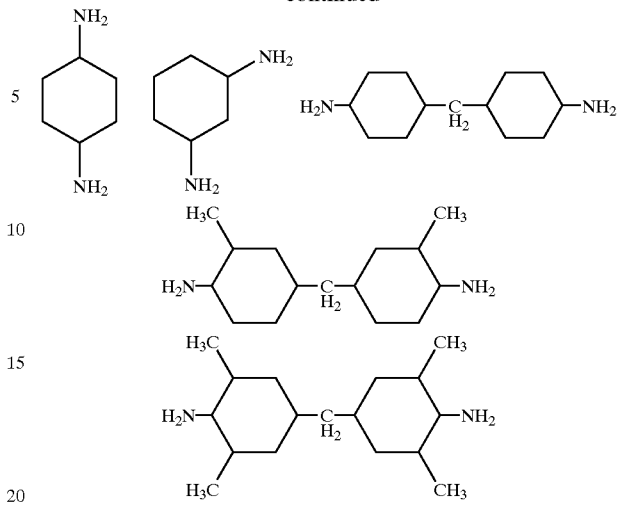

Araliphatic polyamines, such as e.g. 1,2- and 1,4-xylylenediamine or α,α,α',α'-tetramethyl-1,3- and - 1,4-xylylenediamine may also be used as crosslinking agents. The diamines 3,3,5-trimethyl-5-aminomethylcyclohexylamine (IPDA) and 4,4'-diaminodicyclohexylmethane ($H_{12}$MDA) are particularly preferred.

The structural components listed above are present in the reactive dispersions in the following preferred ranges, the addition of all 6 components giving 100% solids in a dispersion:

| | | | |
|---|---|---|---|
| 1.) | polyisocyanates | 9.0 to 30.0 | wt. % |
| | particularly preferably | 13.0 to 20.0 | wt. % |
| 2.) | polyhydroxyl compounds | 40.0 to 85.0 | wt. % |
| | particularly preferably | 55.0 to 75.0 | wt. % |
| 3.a) | ionic hydrophilising agents | 1.0 to 5.0 | wt. % |
| | particularly preferably | 2.5 to 4.0 | wt. % |
| 3.b) | non-ionic hydrophilising agents | 3.0 to 17.0 | wt. % |
| | particularly preferably | 6.0 to 12.0 | wt. % |
| 4.) | blocking agents | 0.5 to 5.0 | wt. % |
| | particularly preferably | 1.5 to 4.0 | wt. % |
| 5.) | chain-extending polyamine | 0 to 5.0 | wt. % |
| | particularly preferably | 0 to 1.5 | wt. % |
| 6.) | polyamine crosslinking agent | 1.0 to 6.0 | wt. % |
| | particularly preferably | 2.0 to 4.0 | wt. % |

The reactive, post-crosslinkable dispersions may be prepared by any processes, for example by the following process. In the conventional manner, an NCO prepolymer is prepared in a single- or multi-step synthesis in which an excess of diisocyanate (1.) is stirred with hydroxyl polyethers/polycarbonates (2.), optionally in the presence of a hydroxyalkylcarboxylic acid, e.g. DMPA (3.a) and a monofunctional polyethylene oxide alcohol (3.b) at 60 to 110° C. for about 3 to 6 hours in the melt until the theoretical NCO content is measured. The highly viscous NCO prepolymer is then diluted with acetone, for example half of the NCO groups present are reacted at approx. 45° C. with a blocking agent (4.) and the remainder of the NCO groups are reacted with a diamine, e.g. IPDA, to extend the chains, or, if no potentially ionic dispersing agent, such as e.g. DMPA, was incorporated in the above prepolymer step, with a potentially ionic dispersing agent, e.g. the adduct of 1 mole IPDA and 1 mole acrylic acid. As soon as no more NCO groups are detectable in this acetone solution, the polyamine crosslinking agent (6.) is added. The quantity of the polyamine crosslinking agent corresponds in terms of its NH$_2$ equivalent to the blocked NCO equivalents. In the case described, the polyamine crosslinking agent also assumes the role of the salt-forming cation with the incorporated carboxylic acid (3.a) and, together with the structural component (3.b), imparts the required hydrophilic properties to the polyurethane described. Water can now be stirred into the acetone solution. As a result, a blue-tinged dispersion is formed. After drawing off the acetone at 45° C. under vacuum, the ready-to-use reactive dispersion is obtained.

When the crosslinking agent (6.) is simultaneously used as a neutralising agent for ionic groups of compounds (3.a), particularly high-grade coagulates or dispersions with particularly good coagulating properties are obtained. This procedure is therefore preferred.

Another embodiment consists in producing a dispersion by the process described and adding the polyamine crosslinking agent only before processing the dispersion.

In the process explained above, the production of the reactive dispersions by the acetone process is described, which generally leads to reproducibly good product quality. Instead of acetone, however, another solvent, e.g. N-methylpyrrolidione, may also be used. An overview of PU dispersions and associated processes may be found in "Rosthauser and Nachtkamp, Waterborne Polyurethanes, Advances in Urethane Science and Technology, vol. 10, pp. 121–162 (1987)". The products according to the invention may, in principle, also be produced without using organic solvents.

Surprisingly, it was found that, by selecting suitable raw materials, reactive, post-crosslinkable polyurethane dispersions with very good water vapour permeability can also be produced.

In this case. e.g. as component 2) of the polyurethane, hydrophilic polyethylene oxide diols or triols, or hydrophilic polyethylene oxide/polypropylene oxide diols or triols and/or hydrophilic polyester diols or triols based on dicarboxylic acids and e.g. tetraethylene glycol are used. Hydrophilic polyols 2) may be used either as the sole polyols 2) or together with hydrophobic polyols 2).

In a preferred embodiment, these hydrophilic components 2.) are contained in the polyurethane capable of coagulation together with the hydrophilising component 3.a) and/or 3.b).

The solids content of the dispersions to be used according to the invention can be between 5 and 60%, the viscosity from about 0.01 to 100 Pa.s. The viscosity may be adapted by thickeners such as, for example, Mirox® AM, Walocel® MT 6000 PV, Rheolate® 255, Collacral® VL etc., and the concentration optionally by diluting with water, to meet the relevant requirements of the dispersions, the processing conditions and the desired properties of the end product.

The reactive, post-crosslinkable polyurethane dispersions used according to the invention may be further modified depending on the mode of application of the end products. Thus, for example, dyes, pigments and/or carbon black, ultraviolet filter substances, anti-oxidants, handle modifiers etc. may be used.

Other dispersions, such as e.g. polyurethane dispersions according to the prior art, polyacrylate, polyacrylonitrile, polyester, polyepoxide, polybutadiene, polystyrene dispersions etc. may also be used at up to 50%, preferably up to 25%, to achieve particular properties.

The coagulates obtained according to the invention may be processed into flat materials in situ, directly in/from the reaction solution.

The invention therefore also provides flat materials produced from the coagulates obtained according to the invention.

The flat materials obtained according to the invention may also be subsequently coloured by known methods.

The characterisation of the dispersions to be used according to the invention takes place by determining the content of non-volatile substances, the viscosity and by determining the stress and strain properties of drawn film strips.

The reactive, post-crosslinkable dispersions to be used according to the invention may be applied e.g. by flow coating, spraying, dipping, kiss rolling, with a film spreader or roller or in a padding machine, and the dispersions may be used in the form of a liquid or foam.

In general, after applying by one of the above methods, coagulation is carried out by immersing in hot water at 50° C. to 120° C., preferably 75° C. to 98° C., with hot water vapour, in special applications by filling shaping parts with hot water, by heating the mouldings to 120° C. to 130° C. or in an oven by means of radiation or high-frequency driers, and then drying and condensing are carried out at 60° C. to 180° C. preferably 100° C. to 160° C.

Textile fabrics, flat substrates of metal, glass, ceramics, leather and plastics such as PVC, polyolefins, polyurethane or similar are suitable as support materials. The term "textile fabrics" within the meaning of the present invention refers to, for example, woven and knitted fabrics, bonded and unbonded nonwoven fabrics. The textile fabrics may be made of synthetic or natural fibres and/or mixtures thereof. Textiles made of any fibres are basically suitable for the process according to the invention.

Special effects of the process according to the invention are the painting of support materials, the coating of substrates, the production of flat and shaped films, such as e.g. in gloves, protective coverings etc., strengthening of nonwovens and general finishing for the purpose of handle variation.

The resulting coagulate is so resistant that the precipitation operation can be carried out with microfibres after application in a saponifying and splitting bath (3% NaOH), wherein a proportion of polyester present may be saponified and dissolved out.

This leads to soft fabrics with a particularly pleasant handle.

The fabrics coated on one or both sides or filled may subsequently be buffed and are then particularly soft. Mechanical treatment in a tumble drier also increases softness.

EXAMPLES

Example 1

(According to the Invention)

The production of a reactive PU dispersion. based on MDI as the isocyanate component, butanone oxime as the blocking agent and 4,4'-diaminodicyclohexylmethane as the polyamine post-crosslinking agent is described.

Mixture

| | | |
|---|---|---|
| 110.0 g | (0.110 g equivalent) | of a polyether polyol with an OH number of 56, produced by propoxylation of trimethylolpropane |
| 110.0 g | (0.110 g equivalent) | of a polycarbonate with an OH number of 56, based on 1,6-dihydroxyhexane |
| 80.0 g | (0.080 g equivalent) | of a polypropylene glycol with an OH number of 56 |

-continued

| | | |
|---|---|---|
| 49.5 g | (0.022 g equivalent) | of a monohydric polyether polyol with an OH number of 25 (dispersing agent), produced by ethoxylation and propoxylation (in blocks of approx. 50/50%) of n-butanol |
| 76.5 g | (0.612 g equivalent) | 4,4'-diisocyanatodi-phenylmethane (MDI) |
| 12.18 g | (0.14 g equivalent) | butanone oxime |
| 60.40 g | (0.15 g equivalent) | dispersing agent (30% aqueous solution of the adduct of 1 mole acrylic acid and 1 mole IPDA, 1 $NH/NH_2$ equivaient = 403 g, 1 COOH equivaient = 806 g) |
| 14.70 g | (0.14 g equivalent) | 4.4'-diaminodicyclohexylmethane ($H_{12}$MDA or PACM 20) |
| 533.57 g | | water |
| 1.046.85 g | | dispersion (45%) |
| 471.00 g | | theoretical solids content |
| 575.77 g | | water content viscosity at 23° C.: approx. 600 mPas |

The dispersed polyurethane above (100%) has a content of blocked NCO groups, calculated as NCO 42, of 1.25 wt. %

$NH_2$ groups, calculated as $NH_2/16$, of 0.47 wt. %

Method

The anhydrous polyols, including the monofunctional "polyethylene oxide dispersing agent", are poured into the total quantity of MDI, with stirring. The reaction mixture is heated to 85° C. After a reaction period of approx. 5 hours, an NCO content of 2.7% is measured, the theoretical value being 2.86%. The mixture is allowed to cool to approx. 6° C., diluted with 500 g acetone and butanone oxime is stirred in at 45° C. After stirring for approx. 30 minutes at 45° C., an NCO content of 0.59% is found, the theoretical value being 0.67%. The aqueous dispersing agent solution is added and stirring is continued at 45° C. for approx. 1 hour until no more NCO groups are detectable. $H_{12}$MDA is then added all at once and is dispersed with water by pouring the water into the acetone solution at brief intervals, stirring well. After distilling off the acetone (45° C., 250–20 mbar, approx. 3–4hours), a milky blue dispersion is obtained with a viscosity (23° C.) of approx. 600 mPas and a solids content of 45%.

Example 2
(According to the Invention)

This reactive dispersion differs from the one according to example 1 only in the blocking agent. Instead of butanone oxime, 13.44 g (0.14 g equivalent) 3,5-dimethylpyrazole are now contained. The bluish dispersion with a solids content of 45% has a viscosity (23° C.) of approx. 4,400 mPas.

Example 3
(According to the Invention)

This reactive dispersion differs from the one according to example 1 only in the blocking agent. Instead of butanone oxime, 14.14 g (0.14 g equivalent) diisopropylamine are now contained. The stable, bluish dispersion with a solids content of 45% has a viscosity (23° C.) of approx. 2,200 mPas.

Example 4
(According to the Invention)

The production of a reactive PU dispersion based on IPDI as the isocyanate component, 1,2,4-triazole as the blocking agent and 4,4'-diaminodicyclohexylmethane as the polyamine crosslinking agent is described.

Mixture

| | | |
|---|---|---|
| 185.0 g | (0.185 g equivalent) | of a polyether polyol with an OH number of 56, produced by propoxylation of trimethylolpropane |
| 230.0 g | (0.230 g equivalent) | of a polybutylene glycol with an OH number of 56 |
| 70.0 g | (0.070 g equivalent) | of a polyether glycol with an OH number of 56, produced by propoxy-ethoxylation (blocks of approx. 50/50%) of water |
| 34.0 g | (0.015 g equivalent) | of a monohydric polyether polyol with an OH number of 25 (dispersing agent, cf. example 1) |
| 100.0 g | (0.90 g equivalent) | isophorone diisocyanate (IPDI) |
| 12.07 g | (0.175 g equivalent) | 1,2,4-triazole |
| 60.45 g | (0.150 g equivalent) | of the potentially ionic dispersing agent according to example 1 |
| 6.37 g | (0.075 g equivalent) | isophorone diamine (IPDA) |
| 18.40 g | (0.175 g equivalent) | 4,4'-diaminodicyclohexylmethane ($H_{12}$MDA or PACM 20) |
| 968.68 g | | water. demineralised |
| 1684.97 g | | dispersion (40%) |
| 673.97 g | | theoretical solids content |
| 1,011.00 g | | water content viscosity (23° C.): approx. 1,000 mPas |

The dispersed polyurethane above (100%) has a content of blocked NCO groups, calculated as NCO/42, of 1.09 wt. %

$NH_2$ groups, calculated as $NH_2/16$. of 0.41 wt. %

Method

IPDI is reacted together with the dehydrated hydroxyl compound at 105° C. for approx. 5 hours until the NCQ content has fallen to 2.67%, the theoretical value being 2.7%. The white flakes of triazole are then added and the mixture is stirred for approx. 1 hour at 100° C. An NCO content of 1.4% is found, the theoretical value being 1.49%. The mixture is then diluted with 500 g acetone and at approx. 45% the aqueous dispersing agent solution is added and 15 minutes later the IPDA. Stirring is continued for 30 minutes at 45° C. and no more NCO groups can be detected (IR spectrum). The polyamine crosslinking agent PACM 20 can now be stirred in and dispersed by adding water 10 minutes later. After distilling off the acetone (45° C., 250–20 mbar, approx. 3–4 hours), a stable (50° C.), milky blue dispersion is obtained with a viscosity (23° C.) of approx. 1,000 mPas and a solids content of 40%.

Example 5
(According to the Invention)

The production of a reactive PU dispersion is described, the coatings of which are water vapour permeable. The structure differs only slightly from that described in example 1. The change relates to the composition of the three polyol components as follows. All other components correspond to those mentioned in example 1 in terms of their quantity and nature.

| | |
|---|---|
| 100.0 g (0.100 g equivalent) | of a polyether polyol with an OH number of 56, produced by propoxylation of trimethylolpropane |
| 100.0 g (0.100 g equivalent) | of a polycarbonate with an OH number of 56, based on 1,6-dihydroxyhexane |
| 100.0 g (0.100 g equivalent) | of a polypropylene/ethylene glycol (polyethylene glycol content approx. 50%) with an OH number of 56 |

The bluish dispersion, almost a solution, with a solids content of 35%, has a viscosity (23° C.) of approx. 2,000 mPas.

Application Example 1
Nonwoven Strengthening

A non-pretreated, non-sized nonwoven based on polyamide and polyester fibres is padded with a dispersion according to example 1 diluted with water to a 10% solids content and treated, open-width, in a hot water bath at 95° C. in which the polyurethane coagulates. The nonwoven is then squeezed out and dried at 120° C. Condensation is then carried out at 150–160° C. for the purpose of film formation. If the drier is sufficiently powerful, both operations may be carried out in one pass. The initial gel solidifies during the heat treatment into a dry, resistant film. The coagulate resists the surface migration of the water during the drying and does not migrate to the surface.

By means of a further mechanical treatment such as tumble-drying, buffing, roughening or by adding finishing agents, a number of handle variations can be achieved. By splitting the nonwoven, in a similar manner to leather production, the diameter of the nonwoven may easily be regulated.

Application Example 2
Nonwoven Strengthening with Subsequent Splitting

A desized nonwoven based on polyamide and polyester fibres is padded with a dispersion produced according to example 2 diluted with water to a 10% solids content and coagulated in a bath with 3% sodium hydroxide solution at 95–100° C. At the same time the polyester fibre contained in the nonwoven is partly saponified and dissolved out. The treatment period is 45 minutes. The nonwoven is then washed thoroughly with water, squeezed out and dried at 120° C. Condensation is then carried out at 160° C. Each side is then buffed once to twice.

A soft textile fabric with a particularly pleasant handle is obtained.

Application Example 3
Painting of Metal and/or Glass Bottles

The metal or glass items are heated to 90–100° C., directly or indirectly by means of heating fluid, and immersed in a dispersion produced in accordance with example 3 diluted to 20%. The film thickness may easily be controlled by means of the immersion time and the concentration of the PU dispersion.

The resulting gel is then dried, contact-free, at 60–80° C. and then condensed at 160° C.

A series of interesting shades may be obtained by adding aqueous pigment preparations.

The coatings are distinguished by very good adhesion values.

Application Example 4
Coating of Fabric Gloves as Industrial Gloves

The fabric blank is drawn over the glove form and immersed with this in the dispersion produced in accordance with example 5 and adjusted to approx. 2,000–3,000 mPas with a commercial thickener. The thickening of the dispersion prevents penetration into the fabric during immersion.

After immersion, the glove which is impregnated on the outside is immersed on the form in hot water at 60–95° C. for 10 sec, and then dried at 120° C. and condensed at 160° C.

If required, pigment preparations may be added to the post-crosslinkable dispersions to produced coloured gloves.

Application Example 5
Unsupported Gloves or Protective Coverings

A form heated to 80–120° C. is immersed in the dispersion according to example 4 diluted to 25% solids.

Depending on the desired film thickness, the residence time is 5–20 seconds.

The gel is then dried on the form at 80–100° C. and then condensed at 160° C.

A film is produced which is free from pores, with very good elasticity and strength.

What is claimed is:

1. A process for the coagulation of a post-crosslinkable dispersion, comprising precipitating the post-crosslinkable dispersion by thermal treatment between 50 and 120° C., and forming a stable, at least partly crosslinked polyurethane or gel.

2. The process of claim 1, wherein the thermal treatment is performed at 75 to 98° C.

3. The process of claim 1, wherein the dispersion comprises
   a) a content of blocked isocyanate groups (calculated as NCO=42) of 0.1 to 7.5 wt. % and
   b) a content of at least one polyamine and/or hydroxyamine with at least two (cyclo)aliphatically bonded primary and/or secondary amino groups,
   wherein the equivalent ratio of blocked isocyanate groups a) to amino groups b) is 1:0.5 to 1:1.5.

4. The process of claim 2, wherein the dispersion comprises
   a) a content of blocked isocyanate groups (calculated as NCO=42) of 0.25 to 5 wt. % and
   b) a content of at least one polyamine and/or hydroxyamine with at least two (cyclo)aliphatically bonded primary and/or secondary amino groups,
   wherein the equivalent ratio of blocked isocyanate groups a) to amino groups b) is 1:0.7 to 1:1.2.

5. The process of claim 2, wherein the dispersion comprises
   a) a content of blocked isocyanate groups (calculated as NCO=42) of 0.7 to 2 wt. % and
   b) a content of at least one polyamine and/or hydroxyamine with at least two (cyclo)aliphatically bonded primary and/or secondary amino groups,
   wherein the equivalent ratio of blocked isocyanate groups a) to amino groups b) is 1:0.9 to 1:1.1.

6. The process of claim 1, wherein the dispersion is prepared from hydrophilic raw materials, and the at least partially crosslinked polyurethane or gel is water vapor permeable.

7. The process of claim 1, wherein the dispersion is prepared from hydrophilic polyols, and the at least partially crosslinked polyurethane or gel is water vapor permeable.

8. A post-crosslinkable polyurethane dispersion, which is capable of coagulation by thermal treatment between 50 and 120° C. to form a stable, at least partly crosslinked polyurethane or gel, and which is prepared from
1. at least one organic di- or polyisocyanate,
2. at least one polyhydroxyl compound with a number-average molecular weight of up to 16000,
3. an ionic or potentially ionic hydrophilizing agent and/or a non-ionic hydrophilizing agent,
4. a blocking agent for isocyanate groups and
5. optionally a low molecular weight mono-, di- or triamine as chain-terminating, chain-extending or chain-branching component, wherein, in addition,
6. a polyamine crosslinking agent is contained in the dispersion, and wherein component 3) is present in an amount sufficient to provide a stable dispersion.

9. The dispersion of claim 8, which is prepared from
1. 9 to 30 wt. % of at least one organic diisocyanate,
2. 40 to 85 wt. % of at least one at least difunctional polyhydroxyl compound with a molecular weight of 350 to 4000,
3. 4 to 22 wt. % ionic or potentially ionic hydrophilizing agents and/or non-ionic hydrophilizing agents,
4. 0.5 to 5 wt. % a blocking agent for isocyanate groups and
5. 0 to 5 wt. % a low molecular weight mono-, di- or triamine as chain-terminating, chain-extending or chain-branching component, wherein, in addition
6. 1 to 6 wt. % polyamine crosslinking agent is contained in the dispersion, and wherein the content of non-ionic hydrophilizing agent 3 is 3 wt. %.

10. The dispersion of claim 8 comprising dimethylolpropionic acid and/or a reaction product of 1 mole diamine and 0.5 to 2 moles acrylic acid as hydrophilizing agent 3.

11. The dispersion of claim 8 comprising butanone oxime, diisopropylamine and/or triazole as blocking agent 4.

12. The dispersion of claim 8 comprising dimethylpyrazole as blocking agent 4.

13. The dispersion of claim 8 comprising a polyamine as crosslinking agent 6, which additionally functions as a neutralizing agent for the acid groups of component 3.

14. The dispersion of claim 8, comprising isophorone diamine, tricyclo diamine, 4,4'-diamino-3,3'-dimethyl-dicyclohexylamine, 4,4"diamino-cyclohexylamine and/or diethylenetriamine as crosslinking agent 6.

15. The dispersion of claim 8, wherein component 2 comprises a hydrophilic polyol.

16. A method of coating a surface comprising using the dispersion of claim 1.

17. Coagulates obtained by the process according to claim 1.

18. Water vapor permeable coagulates obtained by the process of claim 7.

19. An article of manufacture selected from the group of flat materials, textile fabrics, coated substrates, films, gloves and protective coverings that is prepared with coagulates obtained by the process of claim 1.

20. A process of strengthening non-wovens comprising the use of the dispersions capable of coagulation according to claim 8.

* * * * *